United States Patent [19]

McCormack

[11] Patent Number: 5,186,087
[45] Date of Patent: Feb. 16, 1993

[54] WOOD LATHE

[75] Inventor: Allan McCormack, Glynde, Australia

[73] Assignee: Durden & Co. Pty. Ltd., South Australia, Australia

[21] Appl. No.: 766,753

[22] Filed: Sep. 27, 1991

[51] Int. Cl.⁵ .......................... B27C 7/02; B23B 17/00
[52] U.S. Cl. .......................................... 82/142; 142/1; 82/149
[58] Field of Search .................... 142/1; 82/117, 142, 82/149, 146; 29/27 R, 27 A, 27 C; 408/234; 409/235, 240

[56] References Cited

U.S. PATENT DOCUMENTS 2,028,727  1/1936  Perry et al. .................. 82/149 X

FOREIGN PATENT DOCUMENTS 0082446  6/1983  European Pat. Off. ............ 82/149
0115086  8/1984  European Pat. Off. ............ 82/149

OTHER PUBLICATIONS

*Woodturning: A Designer's Notebook*, by Ray Key (New York: Sterling Publishing, 1987), pp. 23-27.

The Woodturner's Catalog, 1989, Craft Supplies USA, Provo, Utah, pp. 6, 7.

*Primary Examiner*—Steven C. Bishop
*Attorney, Agent, or Firm*—Webb, Burden, Ziesenheim & Webb

[57] ABSTRACT

A problem encountered with wood lathes is that they frequently require longer beds, different fixed center heights of their headstocks above the plane of the bed, and bowl turning attachments which are located on the bed or alternatively on the other side of the headstock. This invention provides a lathe (10) having a headstock base (11) separate from the headstock (12), a bowl turning attachment (13) which can be located either on the bed (14) or on the other end of the headstock (12). The bed (14) is provided with alignment apertures (40) (dowel holes) so that it can be bolted to the headstock base (11) the tail end of the bed having alignment apertures (40) so that another bed section can be secured to it or in the alternative, the bowl turning attachment (13) can be secured to it thereby in each instance increasing bed length, and all corresponding alignment apertures (40) which extend longitudinally are co-axial, and the assembly is modular.

25 Claims, 3 Drawing Sheets

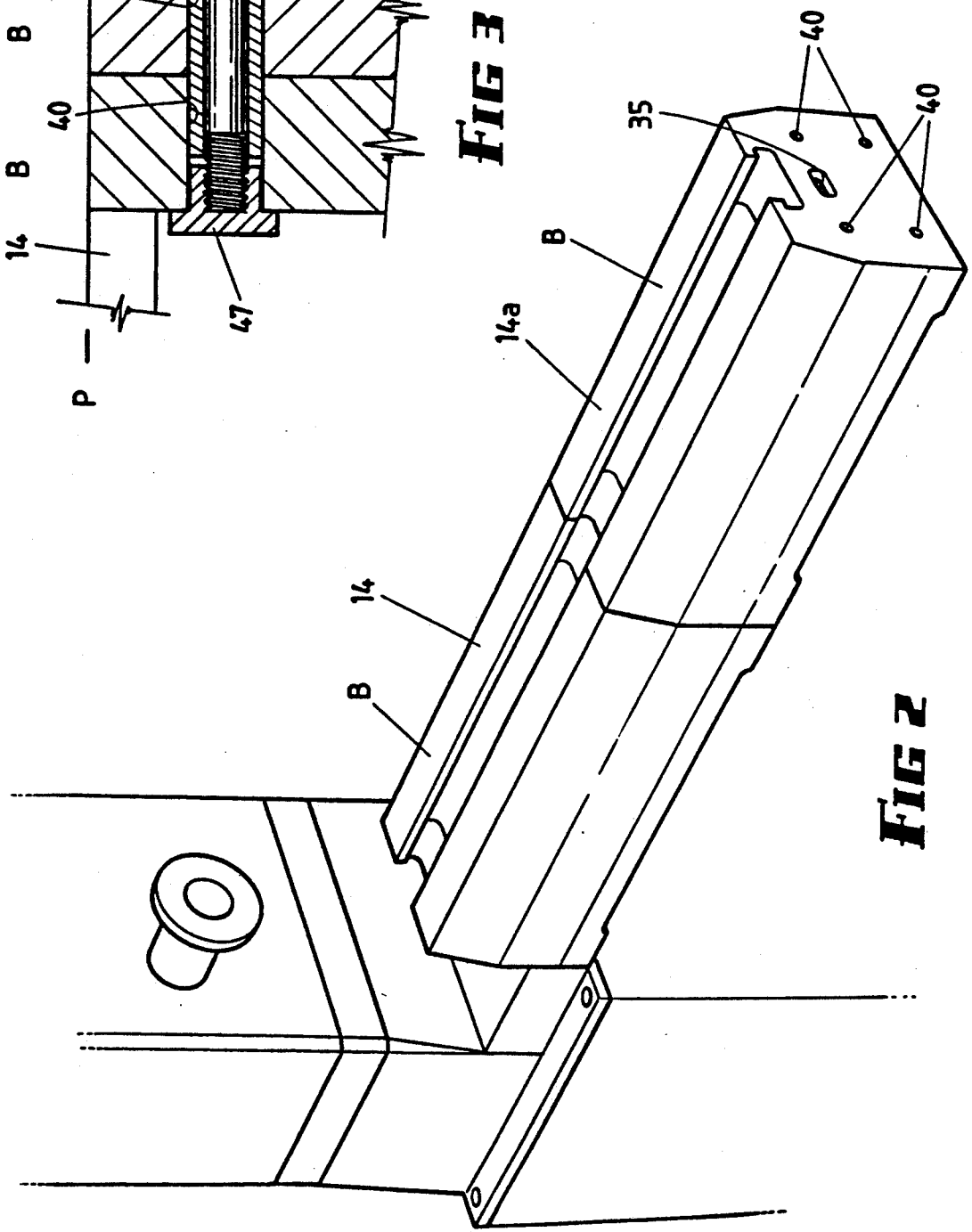

WOOD LATHE

This invention relates to a wood lathe, and in particular is directed to a wood lathe of such modular construction that it is adaptable for varying purposes.

Wood lathes of course are well known, but most lathes have a fixed bed length and a fixed center height above the plane of the bed, yet the requirements vary so widely that frequently a wood lathe is too short, or has a center height which is too small for some jobs to be properly machined.

In one embodiment of this invention a wood lathe is provided with means whereby the center height can be varied, utilising the same headstock but having either spacer means or alternatively, having substitute headstock bases which provide different center heights above a bed.

In most instances it is necessary for a wood lathe to have only a relatively short bed, usually less than two meters in length. Heretofore, beds have invariably been of unitary construction, comprising a single large casting. However with large castings, and particularly with castings having the cross-sectional shape of a wood lathe bed where the length is much greater than the cross-sectional dimensions, uneven shrinkage is likely to occur and shrinkage errors can cause difficulties when machining to close tolerances.

In a further embodiment of the invention, the wood lathe of this invention comprises a separate headstock base, headstock and bed, all bolted and dowelled together, and the bed is made of one section only or alternatively of a plurality of sections secured end to end. This simplifies machining of the bed sections and reduces the likelihood of shrinkage errors developing in the headstock after machining.

Thus in one embodiment, the invention consists of a modular construction wood lathe comprising a bed, a headstock assembly having a headstock base, a headstock, bolts and dowels retaining said bed, headstock base and headstock in an assembly, and bed extension alignment apertures on a tail end of the bed.

It is known to have a bowl turning attachment securable to the headstock end of a wood lathe, and projecting in the opposite direction from the bed. However situations sometimes occur wherein it is desirable for a bowl turning attachment to be at the tail end of the bed, and in a further embodiment of this invention the tail end of the bed is provided with a flat face, the bowl turning attachment is provided with a complementary flat face, and the two are interengageable with dowels and a keyhole clamping device. The bowl turning attachment has the same cross-sectional shape as the bed, at least as far as the side sections are concerned, so that the bowl turning attachment can be utilised to extend the effective length of the bed.

While the invention need not necessarily include the abovementioned details an embodiment is described hereunder in some further detail with reference to and is illustrated in the accompanying drawings in which:

FIG. 2 is a fragmentary isometric drawing showing diagrammatically two bed sections in longitudinal alignment;

FIG. 3 is a section illustrating configuration of a dowel and bolt assembly of two contiguous modules of the lathe;

Figure 1:
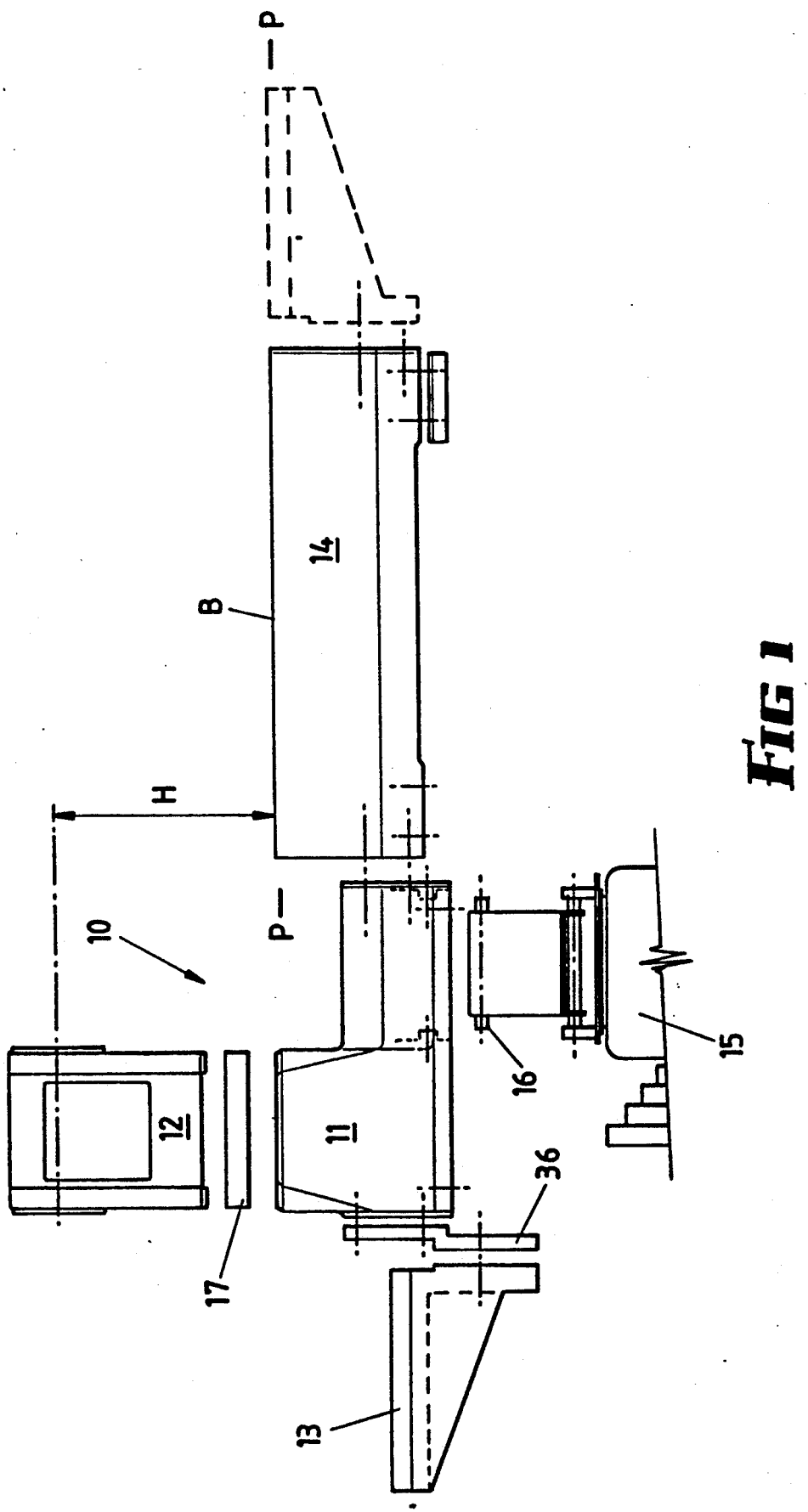
FIG. 1 is an "exploded" elevational view showing a lathe headstock, headstock base, bowl turning attachment, motor and a single bed section.

In this embodiment, a lathe 10 comprises a headstock base 11, a headstock 12 secured to the base, a bowl turning attachment 13 securable either to the head end of the headstock 11 or to the tail end of a bed, a bed 14 comprising at least one short bed section or, in the alternative, a plurality of short bed sections secured end to end, and a motor assembly 15 which is provided with a pivotal mounting 16 by which it is carried from the headstock base 11. A spacer 17 may be interposed between headstock base 11 and headstock 12.

If it is required that a lathe should have a higher or lower center height H above the plane P of the bed section, the more expensive and complex headstock 12 remains unchanged but a headstock base of different height may be used. Additionally, or in the alternative, spacer 12 may be provided between the headstock base and the headstock as described above.

Figure 4:
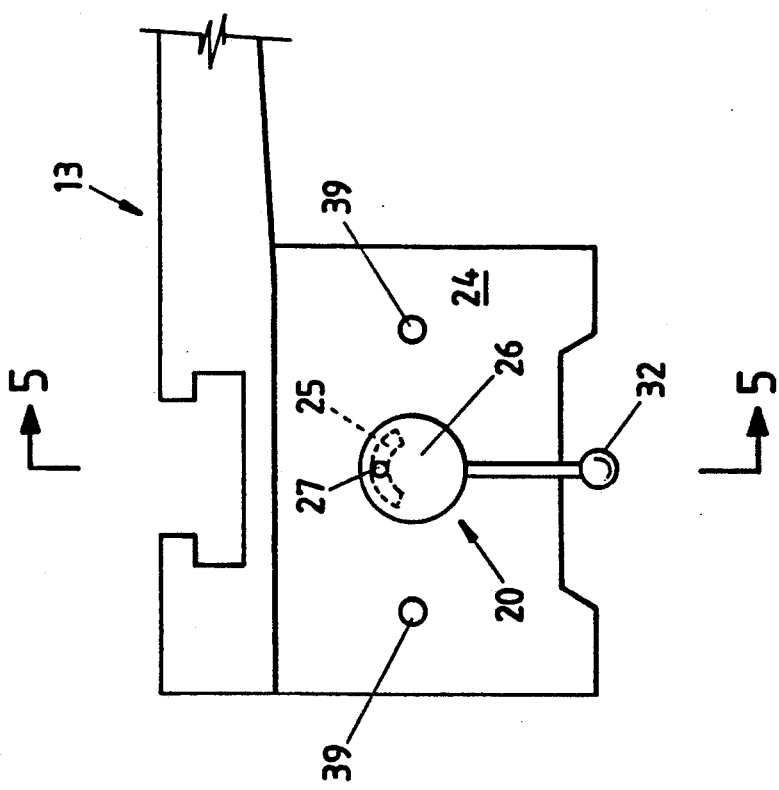
FIG. 4 is a fragmentary end elevation of the bowl turning attachment but drawn to a larger scale than FIG. 1.

The bed section 14 is shown in FIG. 1 as a single short bed section but in normal usage there would be a plurality of sections 14 as shown in FIG. 2, the additional section being marked 14a. The effective bed length can be still further increased in that the bowl turning attachment 13 when secured to the tail end of the bed 14 provides surfaces which are a continuation of the working surfaces of the bed section 14. The bed section 14 is generally similar in cross-sectional shape to portion of the cross-sectional shape of the bowl turning attachment 13 as illustrated in FIG. 4.

Figure 5:
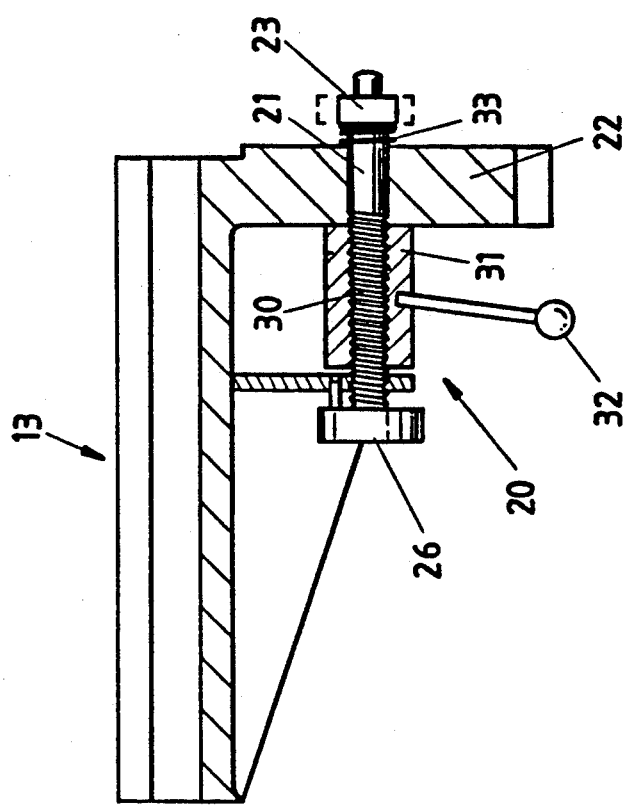
FIG. 5 is a section taken on line 5—5 of FIG. 4.

For the purposes of transferring the bowl turning attachment 13 quickly and easily from the head end of the headstock base 11 to the tail end of the bed section 14, there is provided a keyhole clamping device generally designated 20 in FIG. 5. The keyhole clamping device 20 comprises a spindle 21 rotatable in a depending web 22 of the attachment 13, one end projecting outwardly and terminating in a rectangular locking bar 23 and the other end being carried by a plate 24 which depends from the underside of the upper portion of the attachment 13. The plate 24 is provided with a part-circular groove 25 (FIG. 4) and this limits rotation of a knob 26 due to a pin 27 being movable only for the length of the groove 25 as the knob 26 is rotated.

Part of the spindle 21 is threaded at 30 and this is threadably engaged by a boss 31 which carries on it a control lever 32. Under normal circumstances, a spring 33 urges the locking bar 23 inwardly into a non-circular aperture 35 (shown only in FIG. 2), but alternatively into a similar aperture in an adaptor bracket 36, and the locking bar 23 passes through the aperture. After it has passed through the aperture, the knob 23 is rotated through 90' so that the locking bar then grips the rear face of the metal containing aperture 35, for example adaptor bracket 36, and partial rotation of the lever 32 effects a clamping action. To assist in alignment, there are provided a pair of spaced dowels 39 which enter alignment apertures (not shown) in the adaptor bracket 36. When used on the tail end of a lathe bed 14 or 14a, the dowels 39 for the attachment 13 extend into the upper pair of alignment apertures 40 as shown in FIG. 2. Although four alignment apertures 40 are shown at the tail end of lathe bed extension 14a, in many instances only two are required. All corresponding alignment apertures in the lathe bed extension 14a, lathe bed 14, and both sides of the headstock base 11 are longitudinally aligned and are co-axial. The function of adaptor bracket 36 is to lower the level of bowl turning attachment 13, and bracket 36 contains dowel apertures (not shown) in both its upper portion 36a and lower portion 36b which are spaced laterally by the same distance as shown for holes 40 in FIG. 2. This provides consistency for modular interchangeability.

FIG. 3 illustrates a typical arrangement of dowel/bolt combination, wherein a tubular dowel 45 aligns bed surfaces 13 in plane P, and are retained by bolt 46 which threadably engages headed nut 47.

Throughout all the interengaging means in the vertical clamp faces of the lathe, the same dowel sizes and centers are utilised so as to simplify securing of the modular elements together, and thereby the demand on operator skill is substantially reduced.

A consideration of above embodiment will indicate that the invention provides a great deal of versatility in the construction of a wood lathe, improves some of the characteristics, and does this without incurring high expenses.

I claim:

1. A modular construction wood lathe comprising a bed, a headstock assembly having a headstock base, a headstock, a motor assembly, bolts and dowels retaining said bed, said headstock base and said headstock in an assembly, and bed extension alignment apertures on a tail end of the bed, such that the headstock base is attachable to said tail end of the bed by fasteners extending through one or more of said alignment apertures, said motor assembly being pivotably mounted on said headstock base.

2. A modular construction wood lathe according to claim 1 wherein said headstock assembly comprises a spacer between the headstock base and headstock, also retained in an assembly by bolts and dowels.

3. A modular construction wood lathe according to claim 1 further comprising a bed extension in longitudinal alignment with and retained to said bed by further dowels and bolts extending through said alignment apertures.

4. A modular construction wood lathe according to claim 1 wherein said headstock base also has alignment apertures on opposite sides, said bed being aligned with and retained to said headstock base by said bolts and dowels extending through those said headstock base alignment apertures on one of the sides.

5. A modular construction wood lathe according to claim 4 further comprising a bowl turning attachment also having alignment apertures and being releasably securable to the other of headstock sides by dowels in said alignment apertures and locking means.

6. A modular construction wood lathe according to claim 4 further comprising an adaptor bracket having upper and lower sets of alignment apertures, further bolts and dowels extending through the upper set of alignment apertures securing the adaptor bracket to the other of said headstock base sides, a bowl turning attachment, also having alignment apertures, and being releasably secured to the adaptor bracket by dowels in said lower set of alignment apertures and locking means.

7. A modular construction wood lathe according to claim 5 wherein said bowl turning attachment is releasably securable to said tail end of the bed by dowels and locking means.

8. A modular construction wood lathe according to claim 5 wherein said locking means comprises a keyhole clamp having a rotatable spindle with a non-circular looking bar at one end engageable in a non-circular aperture in either said bracket or said bed tail end.

9. A modular construction wood lathe according to claim 1 wherein corresponding said alignment apertures in said bed and in opposite sides of said headstock base, are co-axial.

10. A modular construction wood lathe according to claim 2 wherein said headstock base also has alignment apertures on opposite sides, said bed being aligned with and retained to said headstock base by said bolts and dowels extending through those said headstock base alignment apertures on one of the sides.

11. A modular construction wood lathe according to claim 10 further comprising a bowl turning attachment also having alignment apertures and being releasably securable to the other of headstock sides by dowels in said alignment apertures and locking means.

12. A modular construction wood lathe according to claim 10 further comprising an adaptor bracket having upper and lower sets of alignment apertures, further bolts and dowels extending through the upper set of alignment apertures securing the adaptor bracket to the other of said headstock base sides, a bowl turning attachment, also having alignment apertures, and being releasably secured to the adaptor bracket by dowels in said lower set of alignment apertures and locking means.

13. A modular construction wood lathe according to claim 6 wherein said bowl turning attachment is releasably securable to said tail end of the bed by dowels and locking means.

14. A modular construction wood lathe according to claim 11 wherein said bowl turning attachment is releasably securable to said tail end of the bed by dowels and locking means.

15. A modular construction wood lathe according to claim 12 wherein said bowl turning attachment is releasably securable to said tail end of the bed by dowels and locking means.

16. A modular construction wood lathe according to claim 6 wherein said locking means comprises a keyhole clamp having a rotatable spindle with a non-circular locking bar at one end engageable in a non-circular aperture in either said bracket or said bed tail end.

17. A modular construction wood lathe according to claim 7 wherein said locking means comprises a keyhole clamp having a rotatable spindle with a non-circular locking bar at one end engageable in a non-circular aperture in either said bracket or said bed tail end.

18. A modular construction wood lathe according to claim 4 wherein corresponding said alignment apertures in said bed and in opposite sides of said headstock base, are co-axial.

19. A modular construction wood lathe according to claim 6 wherein corresponding said alignment apertures in said bed and in opposite sides of said headstock base, are co-axial.

20. A modular construction wood lathe according to claim 8 wherein corresponding said alignment apertures in said bed and in opposite sides of said headstock base, are co-axial.

21. The modular wood lathe claimed in claim 1 wherein said fastener is selected from the group consisting of dowels and bolts.

22. A modular construction wood lathe comprising:
a bed;
a headstock assembly having a headstock base, with alignment apertures on opposite sides;
a headstock;
bolts and dowels retaining said bed, said headstock base and said headstock in an assembly;
bed extension alignment apertures on a tail end of said bed;
a bowl turning attachment having alignment apertures and being releasably securable to the other of headstock sides by dowels in said alignment apertures; and
locking means having a keyhole clamp having a rotatable spindle with a non-circular locking bar at one end engageable in a non-circular aperture in either said bracket or said bed tail end, wherein said bed is aligned with and retained to said headstock base by said bolts and dowels extending through said headstock base alignment apertures on one of the sides.

23. A modular construction wood lathe comprising:
a bed;
a headstock assembly having a headstock base, with alignment apertures on opposite sides;
a headstock;
bolts and dowels retaining said bed, said headstock base and said headstock in an assembly;
bed extension alignment apertures on a tail end of said bed;
bed adaptor bracket having upper and lower sets of alignment apertures;
bolts and dowels extending through the upper set of alignment apertures securing the adaptor bracket to the other of said headstock base sides;
a bowl turning attachment having alignment apertures and being releasably secured to the adaptor bracket by dowels in said lower set of alignment apertures and locking means having a keyhole clamp having a rotatable spindle with a non-circular locking bar at one end engageable in a non-circular aperture in either said bracket or said bed tail end, wherein said bed being aligned with and retained to said headstock base by said bolts and dowels extending through said headstock base alignment apertures on one of the sides.

24. A modular construction wood lathe comprising:
a bed;
a headstock assembly having a headstock base, with alignment apertures on opposite sides;
a headstock;
bolts and dowels retaining said bed, said headstock base and said headstock in an assembly;
bed extension alignment apertures on a tail end of said bed;
a bowl turning attachment also having alignment apertures and being releasably securable to the other of headstock sides by dowels in said alignment apertures; and
locking means having a keyhole clamp having a rotatable spindle with a non-circular locking bar at one end engageable in a non-circular aperture in either said bracket or said bed tail end, wherein said bed being aligned with and retained to said headstock base by said bolts and dowels extending through said headstock base alignment apertures on one of the sides and said bowl turning attachment is releasably securable to said tail end of the bed by dowels and locking means.

25. A modular construction wood lathe comprising:
a bed;
a headstock assembly having a headstock base, with alignment apertures on opposite sides;
a headstock;
bolts and dowels retaining said bed, said headstock base and said headstock in an assembly;
bed extension alignment apertures on a tail end of the bed;
a bowl turning attachment having alignment apertures and being releasably securable to the other of headstock sides by dowels in said alignment apertures; and
locking means having a keyhole clamp having a rotatable spindle with a non-circular locking bar at one end engageable in a non-circular aperture in either said bracket or said bed tail end, wherein corresponding said alignment apertures in said bed and in opposite sides of said headstock base are co-axial and said bed aligned with and retained to said headstock base by said bolts and dowels extending through said headstock base alignment aperatures on one of the sides.

* * * * *

UNITED STATES PATENT AND TRADEMARK OFFICE
CERTIFICATE OF CORRECTION

PATENT NO. : 5,186,087

DATED : February 16, 1993

INVENTOR(S) : Allan McCormack

It is certified that error appears in the above-identified patent and that said Letters Patent is hereby corrected as shown below:

Column 2 Line 58 "90'" should read --90°--.

Claim 8 Line 6 Column 4 "looking" should read --locking--.

Claim 23 Line 36 Column 5 "bed" should read --an--.

Signed and Sealed this

Seventh Day of December, 1993

Attest:

BRUCE LEHMAN

*Attesting Officer*    *Commissioner of Patents and Trademarks*